United States Patent
Vincent et al.

(10) Patent No.: US 7,119,133 B2
(45) Date of Patent: Oct. 10, 2006

(54) LATEX-ENCAPSULATED PARTICULATES FOR INK-JET APPLICATIONS

(75) Inventors: Kent Vincent, Cupertin, CA (US); Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

(21) Appl. No.: 10/360,472

(22) Filed: Feb. 6, 2003

(65) Prior Publication Data

US 2004/0157956 A1    Aug. 12, 2004

(51) Int. Cl.
 *C08K 9/10* (2006.01)
 *C09D 11/10* (2006.01)

(52) U.S. Cl. ...................... 523/205; 523/160

(58) Field of Classification Search .............. 523/160, 523/161, 200, 205; 524/556, 560, 577
See application file for complete search history.

(56) References Cited

U.S. PATENT DOCUMENTS

| | | | |
|---|---|---|---|
| 5,554,739 A | 9/1996 | Belmont | |
| 5,922,118 A | 7/1999 | Johnson et al. | |
| 5,990,202 A | 11/1999 | Nguyen et al. | |
| 6,057,384 A | 5/2000 | Nguyen et al. | |
| 6,248,805 B1 | 6/2001 | Nguyen et al. | |
| 6,417,249 B1 | 7/2002 | Nguyen et al. | |
| 6,767,090 B1 * | 7/2004 | Yatake et al. | 347/100 |
| 2003/0029355 A1 * | 2/2003 | Miyabayashi | 106/31.27 |
| 2003/0044626 A1 * | 3/2003 | Kim et al. | 428/483 |
| 2003/0050362 A1 * | 3/2003 | Sakai et al. | 523/160 |
| 2003/0195274 A1 * | 10/2003 | Nakamura et al. | 523/160 |
| 2003/0225185 A1 | 12/2003 | Akers, Jr. et al. | |
| 2004/0127639 A1 * | 7/2004 | Wang et al. | 524/853 |

FOREIGN PATENT DOCUMENTS

| | | |
|---|---|---|
| EP | 1 088 865 | 4/2001 |
| EP | 1 270 681 | 1/2003 |

OTHER PUBLICATIONS

STN Printout [online]. [Retrieved Oct. 4, 2005]. Retrieved from the Internet: <URL:http://stnweb.cas.org>.*

* cited by examiner

*Primary Examiner*—Callie Shosho

(57) ABSTRACT

The present invention is drawn to a latex-encapsulated particulate, comprising a particulate from 30 nm to 150 nm in size, and a latex at least partially encapsulating the particulate. The latex can have a surface dielectric constant from 2.0 to 3.0 at room temperature, and the latex-encapsulated particulate can have a bulk density from 0.90 $g/cm^3$ to 2.0 $g/cm^3$.

38 Claims, No Drawings

LATEX-ENCAPSULATED PARTICULATES FOR INK-JET APPLICATIONS

FIELD OF THE INVENTION

The present invention relates generally to ink-jet printing with latex-containing inks. More particularly, the present invention relates to latex-encapsulated pigments for ink-jet ink applications.

BACKGROUND OF THE INVENTION

In ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity (typically 5 cps or less) to accommodate high frequency jetting and firing chamber refill processes common to ink-jet pens.

Polymer-encapsulated pigments of various kinds are known. However, the polymer chemistries of these pigments are typically incompatible or effective for use with thermal ink-jet printheads. Such compositions tend to either agglomerate under the high thermal shear conditions of the pen firing chamber, causing nozzle and ink channel blockages, or have excessive glass transition temperatures that prevent room temperature print film formation. Thus, incorporation of such polymer encapsulated pigments within thermal ink-jet inks can result in pen unreliability or poor print durability colorant performance.

Ink-jet prints are also often known for poor durability when exposed to water or high humidity. This results from the use of water-soluble and water dispersible colorants within the water-based ink. There has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film. However, not all colorant will necessarily be protected upon printing, as would be optimal.

Polymers that form durable films are typically made from copolymers having bulk densities on the order of 1.15 g/cm$^3$ or greater, which is appreciably greater than water, the primary component of thermal ink-jet ink. As such, conventional latex particles are normally designed to flocculate so that latex precipitate may be easily shaken or stirred back into dispersion without agglomeration. Such flocculation behavior is well known with latex paints. Unfortunately, these conventional teachings do not address the unique needs of ink-jet printing applications. For example, the micro-channel ink feeds in ink-jet pens are easily clogged with precipitant, particularly when a pen is stored or otherwise unused for prolonged periods of time. Such precipitation is not easily redispersed by pen shaking, as flow constriction prohibits adequate mixing within micro-channels of pen architecture. Additionally, micro-channels used for jetting can house some of the ink over prolonged periods in preparation for firing, and settled latex can cause further constricting of the micro-channels. This can result in ink-jet pen failure due to clogging of the micro-channels. Further, the micron-order settling distances found in the fluid channels of thermal inkjet pens exacerbate the problem.

SUMMARY OF THE INVENTION

It has been recognized that it would be advantageous to develop a latex and particulate combination wherein an ink-jet compatible latex is used to encapsulate a particulate, such as a pigment.

In furtherance of this recognition, a latex-encapsulated particulate can comprise a particulate from 30 nm to 150 nm in size and a latex at least partially encapsulating the particulate. The latex can have a surface dielectric constant from 2.0 to 3.0 at room temperature, and the latex-encapsulated pigment as a whole can have a bulk density from 0.90 g/cm$^3$ to 2.0 g/cm$^3$.

In an alternative embodiment, a latex-encapsulated particulate can comprise a particulate from 30 nm to 150 nm in size, a latex at least partially encapsulating the particulate, and a reactive surfactant covalently attached to the surface of the latex. In a more detailed embodiment, an ink-jet ink can comprise an ink vehicle and a latex-encapsulated pigment dispersed in the ink vehicle. The latex-encapsulated pigment can include a pigment being from 30 nm to 150 nm in size, and a latex at least partially encapsulating the pigment. The latex can have a surface dielectric constant from 2.0 to 3.0 at room temperature, and the latex-encapsulated pigment as a whole can have a bulk density from 0.90 g/cm$^3$ to 2.0 g/cm$^3$.

In still another embodiment, an ink-jet ink can comprise an ink vehicle and a latex-encapsulated pigment dispersed in the ink vehicle. The latex-encapsulated pigment can include a pigment being from 30 nm to 150 nm in size, a latex at least partially encapsulating the pigment, and a reactive surfactant covalently attached to the surface of the latex.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "ink vehicle" refers to the fluid in which colorants and/or latex-encapsulated particulates are dispersed to form ink-jet inks in accordance with the present invention. Many liquid vehicles and vehicle components are known in the art. Typical ink vehicles can include a mixture of a variety of different agents, such as co-solvents, buffers, biocides, sequestering agents, viscosity modifiers, and water.

The term "particulate" includes color-imparting pigments and other dispersible materials, such as ceramics, that can be encapsulated by the latex compositions in accordance with embodiments of the present invention. Pigments that can be used include self-dispersed pigments and polymer dispersed pigments. Self-dispersed pigments included those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle. The pigment can also utilize a physical coating to aid the pigment in becoming and/or substantially remaining dispersed in a liquid vehicle. With respect to the other dispersible materials that can be used, examples include magnetic particles, aluminas, silicas, and/or other ceramics, metallics, or organo-metallics.

"Colorant" can include dyes and/or pigments that may be used to impart color to an ink vehicle in accordance with embodiments of the present invention. Such colorants can be used in addition to the latex-encapsulated particulates.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 w t% to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desire effect. For example, an effective amount of an "ink vehicle" is at least the minimum amount required in order to create an ink composition, while maintaining properties necessary for effective ink-jetting.

The term "freqcel" denotes a reduction in ink drop ejection velocity with increased pen firing frequency. The lowering of drop velocity can be a problem as changes in the trajectory of the fired drops can reduce drop placement accuracy on the print media. Without being bound by one particular theory, freqcel may be attributable to thermal shear stripping of surfactant from latex near a pen firing chamber at the time of drop nucleation. As surfactant is typically present in ink-jet inks to help separate particles, a reduction in surface-adsorbed or surface-attracted surfactant can promote greater inter-particle attraction. This can result in increased ink viscosity. Greater pen firing energy can be used to counteract this phenomenon, but bubble entrapment can be exacerbated at these higher viscosities, which is known to worsen freqcel performance.

The term "decel" denotes an increase in ink flow resistance within pen micro-channels, which in turn, reduces ejected drop volume. Such flow resistance can be caused by changes in ink rheology or plugged channels, and is often responsible for ink starvation within a pen firing chamber.

The term "decap" is a measure of how long a nozzle may remain inactive before plugging and how many pen firings are required to re-establish proper drop ejection.

The terms "surface dielectric constant" and "bulk dielectric constant" as well as the terms "bulk density" and "glass transition temperature" require a detailed explanation. Table 1 below provides, by way of example, certain homopolymers values for homopolymers that can be used to predict bulk or surface dielectric constants, bulk densities, and glass transition temperatures of latex copolymers used to encapsulated particulates in accordance with principles of the present invention. Such predictions can be made in accordance with accepted Bicerano correlations, reported in *Predictions of Polymer Properties*, Bicerano, Jozef, Marcel Dekker, Inc., New York, N.Y., 1996. Table 1 should not be construed as including all homopolymers that can be used to make latex in accordance with principles of the present invention. Additionally, not all of the homopolymers listed in Table 1 are effective for use in making the latex-encapsulated particulates in accordance with principles of the present invention. Table 1 is merely provided to teach what is meant by the terms "surface dielectric constant" or "bulk dielectric constant" as well as the terms "bulk density" and "glass transition temperature."

TABLE 1

| | Homopolymer values | | | | | | | |
|---|---|---|---|---|---|---|---|---|
| Monomer | W | $E_{coh1}$ | $V_w$ | $N_{dc}$ | $\epsilon$ | V | $\rho$ | $T_g$ |
| n-octyl methacrylate | 198.31 | 69686 | 127.08 | 24 | 2.45 | 204.2 | 0.971 | −20 |
| Styrene | 104.15 | 39197 | 64.04 | 10 | 2.55 | 99.1 | 1.050 | 99.9 |
| cyclohexyl methacrylate | 168.24 | 59978 | 99.86 | 24 | 2.58 | 153.2 | 1.098 | 103.9 |
| 2-ethylbutyl methacrylate | — | 59130 | 107.28 | 24 | 2.68 | 163.7 | 1.040 | 11 |
| hexyl methacrylate | 170.23 | 59804 | 106.70 | 24 | 2.69 | 168.5 | 1.010 | −5.2 |
| isobutyl methacrylate | 142.20 | 48496 | 85.60 | 224 | 2.70 | 136.1 | 1.045 | 47.9 |
| t-butyl methacrylate | 142.20 | 46427 | 84.94 | 24 | 2.73 | 139.4 | 1.020 | 107 |
| sec-butyl methacrylate | 142.20 | 48872 | 86.92 | 24 | 2.75 | 135.2 | 1.052 | 57 |
| 2-ethylhexyl methacrylate | 198.31 | 77980 | 127.65 | 24 | 2.75 | 202.2 | 1.020 | 5.2 |

TABLE 1-continued

Homopolymer values

| Monomer | W | $E_{coh1}$ | $V_w$ | $N_{dc}$ | $\epsilon$ | V | $\rho$ | $T_g$ |
|---|---|---|---|---|---|---|---|---|
| n-butyl methacryalte | 142.20 | 49921 | 86.33 | 24 | 2.77 | 134.8 | 1.055 | 20 |
| n-butyl acrylate | 128.17 | 46502 | 76.82 | 24 | 2.87 | — | — | -54 |
| benzyl methacryalte | 176.22 | 64919 | 98.40 | 24 | 2.90 | 149.4 | 1.179 | — |
| hexyl acrylate | 156.23 | 65352 | 98.56 | 24 | 2.91 | 151.6 | 1.030 | -57.2 |
| ethyl methacrylate | 114.15 | 40039 | 65.96 | 24 | 3.00 | 102.0 | 1.119 | 50.9 |
| methyl methacrylate | 100.12 | 35097 | 54.27 | 24 | 3.10 | 85.6 | 1.170 | 104.9 |
| methyl acrylate | 86.09 | 31678 | 44.76 | 24 | 3.28 | 70.6 | 1.220 | 8 |
| ethylene glycol di methacrylate | 198.22 | 88978 | 111.69 | 48 | 3.35 | 169.88 | 1.169 | — |
| methacrylic acid | 86.09 | 38748 | 45.99 | 24 | 3.52 | 70.6 | 1.219 | 187 |
| hydroxyethyl methacrylate | 130.14 | 66502 | 69.44 | 36 | 3.74 | — | — | 86 |
| methacryloyl-oxyethyl succinate | 230.22 | 111243 | 116.06 | 72 | 3.84 | 177.4 | 1.298 | 58.3 |
| acrylic acid | 72.06 | 35329 | 36.48 | 24 | 3.90 | 53.5 | 1.347 | 106 |

In Table 1 above, the abbreviations used are defined as follows:
W Monomer molecular weight (grams/mole)
$E_{coh1}$ Cohesive energy (joules/mole)
$V_w$ Van der Waals volume (cm$^3$/mole)
$N_{dc}$ Fitting parameter (cm$^3$/mole)
$\epsilon$ Dielectric constant (no units)
V Molar volume (cm$^3$/mole)
$\rho$ Density (grams/cm$^3$)
$T_g$ Glass transition temperature (Celsius)

From these values, the bulk or surface dielectric constant, bulk density, and glass transition temperature of latex copolymers formed by copolymerization of any combination of these monomers (or other known monomers where these values are available) may be predicted.

With respect to latex that is polymerized or copolymerized to be roughly uniform throughout, the terms "bulk dielectric constant" and "surface dielectric constant" can be used interchangeably. For example, the bulk dielectric constant describes not only the core hydrophobicity, but also the surface hydrophobicity, as the core and the surface are, on average, of the same material. However, in embodiments where a core-shell, inverse core-shell, or composite latex is formed, the bulk dielectric constant will usually be different than the surface dielectric constant, as the core of the latex will be of a different polymer or copolymer than the shell. Thus, in core-shell, inverse core-shell, and composite embodiments, it is primarily the dielectric constant of the shell material, i.e., the surface dielectric constant, which plays a role in surfactant adsorption. As a result, when referring to dielectric constant values, surface dielectric constant values will be used, as the surface dielectric constant values account for both single material latex copolymers as well as core-shell, inverse core-shell, and composite latex copolymers.

It is to be noted that the above definitions with respect to "surface dielectric constant," "bulk density," and "glass transition temperature" provide properties of the latex only. As the present invention is drawn to latex-encapsulated particulates, such as latex-encapsulated pigments, the properties of the particulates can also be considered when appropriate, particularly with respect to bulk density. This is because bulk density is a measure of both the latex and the particulate that is encapsulated by the latex.

Generally, the term "reactive surfactant" means any surfactant (e.g., surfmer, non-migratory surfactant, etc.) that has the ability to fix itself onto the surface of a latex particle, such as, for example, by formation of a covalent bond. Typically, the reactions between reactive surfactants and the latex particle surface are sufficiently strong to prevent separation and migration therebetween.

Generally, the term "non-reactive surfactant" includes surfactants that are adsorbed (as opposed to fixed, reacted, or bonded) onto the surface of the latex particle. During high-speed printing operations, non-reactive surfactants are typically desorbed or stripped off of the latex particle surface, unless the latex particle surface exhibits favorable conditions, such as a low dielectric constant. These surfactants can be adsorbed on the surface of the latex by matching, within a reasonable range, the surface delectric constant of the latex and the hydrophobic moiety of the surfactant.

The definition of reactive surfactant and non-reactive surfactant can be more fully appreciated with reference to the descriptions and examples contained hereafter.

The term "encapsulate" or "encapsulated" includes partial to complete encapsulation of a particulate with a latex. This can be done by adsorption or by reacting the latex on the surface of the particulate.

With this in mind, it has been recognized that it would be advantageous to develop a latex and particulate combination wherein an ink-jet compatible latex is used to encapsulate a pigment. Typically, the particulate is a color-imparting pigment, though other particulates can be used, i.e., ceramics, magnetic particulates, metallics, organometallics, etc. Thus, when discussing embodiments of the invention wherein a latex-encapsulated pigment is described, it is understood that other latex-encapsulated particulates can be substituted therein.

Where a pigment is encapsulated by a latex, such combinations can be advantageous as the combined surface areas of latex and pigment particles, if included separately in an ink vehicle, can adversely increase the viscosity of the ink-jet ink such that drop ejection rates and drop weight are limited to lower than otherwise norms. Such viscosities can also negatively impact the collapse of nucleated vapor bubbles on thermal drop ejection, entrapping gas within a firing chamber upon subsequent firings. Entrapped gas can retard ink jettability. Likewise, differences between latex and pigment surface charges and charge levels can induce dispersion instabilities and performance changes within an ink-jet ink over time. In addition, pigment and latex can dissociate in the fibers of plain paper, reducing the durability and optical density of the print. Still further, many entrapped pigment particles, once printed on a substrate, can be exposed above the surface of latex film formed at printing, thereby lowering print gloss and inducing gloss non-uniformities between different colored pigments within a print.

In accordance with an embodiment of the present invention, a latex-encapsulated particulate, such as a pigment, can comprise a particulate from 30 nm to 150 nm in size, and a latex at least partially encapsulating the particulate. The latex itself can have a surface dielectric constant from 2.0 to 3.0 at room temperature, and further, the latex-encapsulated particulate can have a bulk density from 0.90 g/cm$^3$ to 2.0 g/cm$^3$, though a range from 0.90 g/cm$^3$ to 1.10 g/cm$^3$ can also be used. This surface dielectric constant range can facilitate adsorption of non-reactive surfactants to the surface without significant thermal stripping if subjected to an ink-jetting process. In one embodiment, the latex-encapsulated particulate as a whole can be from 150 nm to 350 nm in size.

In an alternative embodiment, a latex-encapsulated particulate can comprise a particulate from 30 nm to 150 nm in size, a latex at least partially encapsulating the particulate; and a reactive surfactant covalently attached to the surface of the latex.

In another embodiment that is directed more specifically directed to ink-jet inks for printing images, an ink-jet ink can comprise an ink vehicle, and a latex-encapsulated pigment dispersed in the ink vehicle. The latex-encapsulated pigment can include a pigment being from 30 nm to 150 nm in size, and also can include a latex at least partially encapsulating the pigment. The latex can have a surface dielectric constant from 2.0 to 3.0 at room temperature, and the latex-encapsulated pigment can have a bulk density from 0.90 g/cm$^3$ to 2.0 g/cm$^3$, though a range from 0.90 g/cm$^3$ to 1.10 g/cm$^3$ can also be used. In one embodiment, the latex-encapsulated pigment as a whole can be from 150 nm to 350 nm in size.

In yet another embodiment, an ink-jet ink can comprise an ink vehicle and a latex-encapsulated pigment dispersed in the ink vehicle. The latex-encapsulated pigment includes a pigment being from 30 nm to 150 nm in size, a latex at least partially encapsulating the pigment, and a reactive surfactant covalently attached to the surface of the latex.

Systems utilizing the compositions of the present invention are also disclosed wherein the inkjet inks are included in an ink-jet pen configured for ink-jet printing applications.

Each of the above formulations can be used to overcome or significantly reduce difficulties often associated with latex/particulate applications, particularly in the ink-jet ink printing art. For example, such an encapsulation can reduce the number of total particles in solution, and thus, their combined surface areas are reduced resulting in reduced ink viscosity. Additionally, these compositions can provide a particle dispersion having a substantially uniformly charged surface from particle to particle, which can improve stability. Additionally, by encapsulation, particulate and latex separation can be reduced such that print durability and optical density are more optimized. Further, with respect to ink-jet ink printing applications with a pigment as the particulate, such a configuration can assure that substantially all of pigment particles are at least partially trapped below the surface of a latex formed film, thereby improving gloss and color-to-color gloss uniformity. When latex-encapsulated particulates, such as pigments, are printed, the latex layer surrounding the pigment film can combine with the latex layers of adjacent encapsulated pigments as well.

With respect to latex-encapsulated particulate construction, in a first embodiment, a latex particle can be formed in-situ around one or more particulate using one of many known emulsion processes. When referring to particulates in general, it is understood to include color-imparting pigments, though other particulates can be included as well. Such known emulsion processes can be carried out by providing a monomer pre-emulsion containing a pre-milled or pre-stirred particulate and monomer mix added to water. Pre-mixing can serve to disaggregate the particulate while simultaneously allowing wetting of the monomers with the particulate surface. The particulate surface can optionally be pretreated with molecular or polymeric species to enhance latex-monomer wetting, adhesion, and/or dispersion. Pretreatment can also include covalently bonded species to which monomers absorb or react.

Pigment pretreatments are known in the art, as exemplified in U.S. Pat. No. 5,554,739, which is incorporated herein by reference. In this patent, the reactions of certain diazonium salts with carbon black pigments are exemplified. Additionally, this patent describes pigment pretreatment with aniline derivatives. Such an aniline may be reacted with methacryloyl chloride to form a methacrylate reactive species covalently attached to the pigment surface that is fully reactive with, and generally of identical reactive chemistry to, the monomers of the latex. Pigment treatments including adsorbed polymers and surfactants on pigment surfaces are also known and commercialized for coatings and printing applications. Such pigment treatments are represented by SUNSPERSE™ and FLEXIVERSE™ pigments from Sun Chemical Corp. Adsorbed monomers that preferentially attach to the surface of the pigment in aqueous solution, such as fatty acrylates, can also be useful in accordance with principles of the present invention. Such monomers can be represented by octadecyl acrylate.

In formulating such composition, the pre-emulsion of latex monomers can include the use of treated and/or untreated pigment, which can be added dropwise to a water bath. To the bath can also be added a reactive initiator to initiate monomer polymerization in the latex particle formation process. The wetting of the monomer and pigment can promote encapsulation of the pigment by the formed latex polymer. The pigment size and dispersion chemistry can be optimized to allow for good initial pigment to monomer homogeneity in the emulsion droplet, and to provide desired encapsulated particle size during latex formation. The pigment can be selected such that it will not independently precipitate out of the emulsion droplet as the monomers are polymerized.

Similar pretreatments for generalized color pigments are described in U.S. Pat. No. 5,922,118, which is also incorporated herein by reference. There, in one embodiment, diazonium salts of the type $XN_2ArR$, where X is a halogen anion and R is any of a number of functional groups or chemical entities that can be substituted on an aromatic ring, are described. The diazonium salts can react with pigment surfaces to form a p-ArR surface treatment, where p represents a pigment surface. For the purposes of this invention, the R species can include hydrophobic moieties attractive to latex monomers, pigment dispersing moieties, reactive species, or any combination of these.

In another embodiment, the latex can be independently fabricated and subsequently adhered or bonded to untreated or pretreated pigment under the action of solvents, milling, heat, or any combination of these. In general, this approach does not typically lead to fully or uniformly encapsulated pigment, though this can be more closely achieved in some instances. However, when adequately adhered to the pigment or other particulate surface, the latex particle can serve the same purpose as the in-situ processed particle described above.

In one preparative example, latex, solvent, and pigment can be ball milled with zirconium balls for 24 hours. As a result, the solvent softens the latex such that milling results in adhering the latex to the pigment surface. In another embodiment, surface groups on the pigment can be chemically linked to the encapsulating latex. For example, carboxylates on the pigment and latex can be linked with diiodo compounds.

The latex of the present invention can be prepared through conventional free radical addition of a monomer mixture through emulsion polymerization. Suitable monomers are included in U.S. Pat. No. 6,057,384, which is incorporated herein by reference. The latex can be dispersion stabilized through incorporation of a monomer or monomers that promote latex surface charge, including those represented by acrylic acid, methacrylic acid, vinyl benzoic acid, and methacryloyloxyethyl succinate. These charge forming monomers typically are present in the copolymer at from 0.5 wt % to 20 wt %. In another embodiment, the charge forming monomers can be present at from 3 wt % to 10 wt % of the monomer mix. These charge forming monomers can be neutralized after latex polymerization to form salts. In one embodiment, the salts can be formed through the reaction of a latex carboxylic acid with potassium hydroxide.

Particle dispersion stability is also influenced by particle density, which influences the ability of particles to settle within pen microchannels. In accordance with embodiments of the present invention, the latex and the pigment are selected to be at a ratio to collectively produce particles having a bulk density of 0.90 g/cm³ to 1.10 g/cm³. In a more detailed embodiment, the bulk density can be from 1.02 g/cm³ to 1.05 g/cm³. This more narrow range results from the understanding that the liquid vehicle of aqueous ink jet inks has a density on the order of about 1.02 g/cm³.

In a more detailed embodiment, the bulk density range provided can be modulated such that the bulk density is in a range slightly above or below the liquid component density of the predominantly water-based ink vehicle. Within a relatively narrow density band above or below this level, Brownian energy can prevent latex settling or floatation, respectively. As ink vehicle fluid densities of predominantly water-based ink-jet inks are typically about 1.02 g/cm³, bulk densities of latex-encapsulated particulates that are approximately the same to slightly higher or lower can be included with little to no settling over a period of years. Thus, in this embodiment, in order to prevent latex-encapsulated particulate settling or floatation, the density can be kept in a range slightly higher or slightly lower than the density of an ink vehicle and within the range that Brownian momentum exchange is effective. The rate of settling can increase with the difference between the vehicle and latex densities. However, if the pigment is only partially encapsulated, and the pigment has stronger ions, such as sulfonate or phosphate ions, attached to its surface, these particles can be further prevented from floating or settling, even if higher bulk densities are used.

One strategy that can be used to obtain appropriate bulk density is to utilize low-density latex polymers having at least one ring containing monomer. The ring containing monomer improves the print film durability of the latex. In one embodiment, the latex according to this aspect of the invention can contain a blend of alkane, e.g., hexyl methacrylate, and ring-based, e.g., styrene, monomers to adjust the thermal glass transition temperature for print film formation at a given temperature. The use of these or other similar polymers can provide the above-mentioned benefits without a reduction in print film durability.

The glass transition temperature of the polymer can fall in the range of about $0°\ C.<T_g<50°\ C$. In an alternative embodiment, the glass transition temperature range can be from $10°\ C.<T_g<40°\ C$. These temperature ranges can allow for room temperature film formation of an ink without process or pen induced particle agglomeration. Higher glass transition temperature ranges can be selected for use when latex coagulation is accomplished at a higher than ambient temperature, for example by heated fuser roller. When using a conjugated ring structure, the π-electrons of such ring structures can provide strong adhesive forces without the added density typical of more polar monomers. Additionally, a blend of alkane and ring-based monomers can be used to adjust the thermal glass transition temperature ($T_g$) of the latex copolymer for print film formation.

The latex can also be stabilized to protect from thermal shear degradation by the incorporation of a crosslinking agent or multimer, such as a dimer, into the copolymeric latex. For example, from 0.1 wt % to 5 wt % of such a multimer can be used. Alternatively, from 1 wt % to 2 wt % of such a multimer can be used. These crosslinking agents are capable of forming crosslinks between polymer chains in the latex particle. Examples of appropriate crosslinking agents that can be used include ethylene glycol dimethacrylate, pentaerythritol tetraacrylate, ethyleneglycol dimethacrylamide, divinyl benzene, or other monomers with polymerizable di- or polyfunctional groups. This relatively narrow range of crosslinking can aid in maintaining the integrity of latex under the high thermal shear conditions that occur during thermal ink-jet printing, while not adversely impacting its room temperature film-forming properties.

With specific respect to the latex of the latex-encapsulated particulates of the present invention, copolymeric latexes having a surface dielectric constant from 2.0 to 3.0 provide acceptable properties. In one embodiment, the surface dielectric constant can be from 2.3 to 2.8. Such dielectric constant ranges for latex copolymers provide sufficient dielectric constant hydrophobicity to sufficiently anchor surfactants (if present) to the latex, thereby protecting against substantial thermal shear stripping that can occur in thermal ink-jet printing applications. A latex surface dielectric constant as low as 2.0 can be achieved by incorporating monomers having a very low dielectric constant. Examples of such monomers include fluorosilicons or fluorocarbons.

Generally, the latex particles of the present invention can be prepared by mixing monomers together to form a monomer mixture. Surfactant(s) can then be added to the monomer mixture and sheared to form an emulsion. The surfactant(s) can include a reactive surfactant, a non-reactive surfactant, or a combination of reactive and non-reactive surfactants. In one embodiment of the invention, non-reactive surfactants can be used to form the latex particle, and reactive surfactants can be used, either in concert or added in a second step. Alternatively, polymerization can be carried out as a soap-free polymerization, with a reactive surfactant being added near the end of polymerization.

As described, dielectric constant values can be used as a measure of hydrophobicity. Steric stabilizers, such as surfactants, can be used to control the latex-encapsulated particulate size during polymerization, and can also be selected to provide additional particle dispersion stability. Such stabilizers can be adhered to the particle surface to minimize thermal stripping under pen firing conditions. This phenomenon can be prevented by matching the hydrophobicity of the latex monomer set and the non-reactive surfactant. The hydrophobic segments of conventional surfactants typically comprise long branched or unbranched hydrocarbon chains, e.g., from 5 to 50 atoms in length, at a first end, and branched or unbranched long hydrophilic chains, e.g., from 5 to 100 atoms in length, at the other end. An example of such an unbranched surfactant is shown as Formula 4 below:

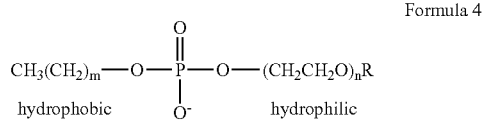

Formula 4 wherein m can be from 5 to 50, n can be from 5 to 100, and R can be H or $CH_3$. Formula 4 merely provides one exemplary surfactant that can be used. Other known surfactants can also be used. As shown, the hydrophobic moiety and the hydrophilic moiety can be bound together by an acid, such as a phosphoric acid. Such an acid can add charge to the surface of the latex, which compliments the charge that may already be present on the surface. Further, the hydrophilic moiety can add steric stabilization to the surface of the latex.

Hydrophobic moieties of the surfactant, if primarily aliphatic, typically are expected to have dielectric constants of about 2.3, as is nominal for polyolefins. Good adhesion of a hydrophobic moiety of a surfactant to the surface of a latex particulate can occur when the dielectric constants of the two are matched as closely as can be achieved. Departure from optimal adhesion is believed to be proportional to the dielectric constant difference between a hydrophobic moiety of the surfactant and the surface of the latex. As a result, it has been recognized that a narrow range of latex surface dielectric constants, as well as bulk densities, can be obtained by engineering latexes to meet these criterion. By obtaining one or both of these properties, if a surfactant is desired to be adsorbed on the surface of the latex, adequate surfactant adhesion can be obtained to minimize or eliminate latex printability and dispersion related problems often associated with latex-containing ink-jet inks. Further, such formulations can prevent both latex floatation and settling within an aqueous-based ink vehicle. In other words, upon adhesion of the hydrophobic moiety of the surfactant to the surface of a latex particulate, the hydrophilic moiety can extend from the surface in a hair-like manner, providing properties to the hydrophobic latex particulate that makes it useable in a predominantly water-based ink-jet ink vehicle. In accordance with the present invention, the latexes referred to are part of the latex-encapsulated particulates described herein.

It is understood that the surface dielectric constant of a latex particle is of primary concern in situations where a non-reactive surfactant is being used to provide dispersion stability. Thus, in alternative embodiments of the invention, non-reactive surfactants having a dielectric constant closely matched to the dielectric constant of the latex particle can be used. Without being restricted to any particular theory, the adsorption between the hydrophobic segment of the non-reactive surfactant and the latex surface seems to improve as the dielectric constants are more closely matched, thus making the non-reactive surfactant less likely to strip off during jetting from a thermal ink-jet pen.

Similar to non-reactive surfactants, reactive surfactants are molecules that typically have a hydrophobic segment and an ionizable and/or polar segment or group. The hydrophobic segment preferentially absorbs onto the surface of the latex particle during and following particle polymerization. The hydrophilic segment extends into the normally aqueous solution phase and thereby provides a steric barrier against particle coagulation. Unlike their non-reactive counterparts, reactive surfactants additionally contain a reactive group on a hydrophobic segment that is capable of covalently bonding to the latex surface. In one embodiment of the present invention, the reactive group is of the same reactive species as that found in the latex monomer(s) so that the surfactant reacts more readily into the latex surface during the latex polymerization reaction. It is understood that the reactive surfactant can also bind to the latex surface through other and subsequent reaction means.

Suitable reactive surfactants for use with the present invention include any surfactants having a reactive group on the hydrophobic segment that are capable of covalently bonding to the surface of a latex particle. The length and composition of the hydrophobic segment of the reactive surfactant can be selected to substantially correspond to the surface chemistry and the Theological needs of the latex particle. One such representative hydrophobic segment is a $C_{10-20}$ alkyl chain. The hydrophilic group may be anionic, cationic, or non-ionic. Suitable anionic functional groups include, for example, sulfonate, phosphonate, and carboxylate ions. Suitable cationic functional groups include, for example, ammonium ions. Suitable non-ionic surfactants typically include surfactants exhibiting ethoxy group hydrophilicity.

The reactive group can be selected based on the reactive species of the latex monomer. For example, acrylate reactive groups could be selected as reactive groups for use with lattices that are polymerized via vinyl, acrylic and styrenic monomers. A representative reactive surfactant for such a reaction is MAXEMUL™ 6106 (available from Uniquema), which has both phosphonate ester and ethoxy hydrophilicity, a nominal $C_{18}$ alkyl chain with an acrylate reactive group. Other representative reactive surfactants with phosphate ester functionalities suitable for such reactions include, but are not limited to, MAXEMUL™ 6112, MAXEMUL™ 5011, MAXEMUL™ 5010 (all available from Uniquema). Alternative reactive surfactants suitable for use with various embodiments of the present invention include polyoxyethylene alkylphenyl ether ammonium sulfate (available from Montello, Inc. as HITENOL BC-10™, HITENOL BC-1025™, HITENOL BC-20™, HITENOL BC-2020™, HITENOL BC-30™), polyoxyethylene alkylphenyl ether (available from Montello, Inc. as NOIGEN RN-10™, NOI- GEN RN-20™, NOIGEN RN-30™, NOIGEN RN-40™, and NOIGEN RN-5065™), sodium allyloxy hydroxypropyl sulfonate (available from Rhodia as SIPOMER COPS-1™), alkenyl-functional nonionic surfmers, allyl methoxy triethylene glycol ether, sodium methallyl sulfonates, sulfopropyl acrylate, vinyl sulfonate, vinyl phosphate, monosodium ethylsulfonate monododecyl maleate, sorbitol acrylate, sorbitol methacrylate, perfluoro heptoxy poly(propyloxy) methacrylate, phenoxyl poly(ethyleneoxy) acrylate, phenoxyl poly (ethyleneoxy) methacrylate, nonyl phenoxy poly (ethyleneoxy) crotanate, nonyl phenoxy poly (ethyleneoxy) fumarate, nonyl phenoxy poly (ethyleneoxy) acrylate, nonyl phenoxy poly (ethyleneoxy) methacrylate, mono dodecyl maleate, and allylsulfosuccinate derivatives (such as TREM LT-40™ (available from Henkel)). In particular embodiments of the invention, where applicable, the reactive surfactant will include 1 to 40 ethyleneoxy or propyloxy units.

In addition to the latex properties described above, the latex can also optionally contain color stabilizers that associatively protect pigment colorant against photo, thermal, and/or gaseous degradation.

In another embodiment, the latex used to form the latex-encapsulated particulates of the present invention can include a conventional core-shell or inverse core-shell latex structure, or composite latex. Such a composite latex can be prepared in accordance with principles of the present invention, wherein the shell layer incorporates a monomer mix in accordance with the properties described herein, e.g., surface charge monomer, multimer, dielectric constant specifications, etc. The shell layer, in this case, can provide thermal shear and dispersion stabilizing properties independent of the properties of the latex core. Additionally, the core and shell polymers collectively, as well as the particulate or pigment encapsulated, can be configured to produce a latex particle having a bulk density as defined previously with respect to non-composite polymeric or copolymeric latexes. As is known in the art, core-shell latexes can be prepared in a two-step process, where a first latex particle is synthesized and forms a seed for polymerization of shell monomers around the seed particle.

With specific reference to the particulates that can be used, in one embodiment, the particulate is a color-imparting pigment. Such a pigment can be a polymer dispersed pigment, or alternatively, the pigment can be a self-dispersed pigment. As mentioned, examples of polymer-dispersed pigments include SUNSPERSE™ and FLEXIVERSE™ pigments from Sun Chemical Corp. Examples of self-dispersed pigments that can be used include CaboJet 200 and CaboJet 300. Further, in using these compositions for preparing ink-jet inks, additional colorant such as dyes and/or pigments can be used that is not part of the latex-encapsulated pigments disclosed herein.

Whether using single material latex or a composite latex for the latex-encapsulated particulate, as long as the latex-encapsulated particulate is prepared in accordance with the principles described herein, problems associated with freqcel, decap, and decel can be substantially improved. For example, freqcel can be proportionately overcome by increased latex surface hydrophobicity. A latex of a latex-encapsulated particulate that is principally comprised of a methyl methacrylate-hexyl acrylate copolymer, for example, can show freqcel at 3 kHz, while a significantly more hydrophobic styrene-hexyl methacrylate copolymer latex shows virtually no freqcel through 12 kHz. More hydrophobic latex, however, when stripped of its surfactant through dialysis, shows significant freqcel at 3 kHz, as observed with the less hydrophobic latex. Without being bound by any particular theory, the adhesion between the hydrophobic segment of non-reactive surfactant and the latex surface seems to improve as the dielectric constants are more closely matched, thus making the surfactant less likely to strip off during jetting from a thermal ink-jet pen. Reactive surfactants, on the other hand, do not require such dielectric matching, as reactive surfactants are typically covalently bound to the surface of the latex.

Further, both decel and decap are also influenced by the attractive forces that exist between latex-encapsulated particulates and the extent of surfactant adhesion. Latex-encapsulated particulates that are more hydrophobic with respect to the latex, and have a lower bulk dielectric constant with respect to the latex-encapsulated particulate, tend to have lower van der Waals attraction energy. Likewise, surfactants attached to a more hydrophobic particle surface are less likely to be dislodged as particles approach each other or ink-jet pen surfaces. As a latex surface having well distributed surfactant coverage is more likely to stay hydrated and separated from other surfaces, better latex-encapsulated particulate performance can be achieved.

A typical ink vehicle formulation that can be used with the latexes described herein can include water, and optionally, one or more co-solvents present in total at from 0 wt % to 30 wt %, depending on the pen architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the ink vehicle is predominantly water.

Classes of co-solvents that can be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the ink vehicle is not the same as the surfactant that is described as being adhered to the surface of the latex-encapsulated particulates, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Surface Modified Black Pigment

About 17.7 g of an experimental carbon black pigment having covalently attached amine groups via a diazonium salt coupling reaction was dispersed in 150 g of methylene chloride to form a slurry. The slurry was cooled to 0° C. and then admixed with 25 ml of triethylamine followed by 14.5 ml acryloyl chloride. The resultant mixture was stirred at ambient temperature for 22 hours. Dichloromethane and other volatiles were removed under vacuum. The product was then washed with water to remove the triethylamine hydrochloride and residual water-soluble components. A carbon black pigment with surface acrylamido groups was obtained.

Example 2

Preparation of Latex-encapsulated Carbon Black Pigment

About 5 g of the acrylamido-modified carbon black pigment prepared in Example 1 was admixed with 6 g styrene, 7.35 g hexyl methacrylate, 1.5 g methacrylic acid, and 0.15 g ethylene glycol dimethacrylate in 20 g water containing 1.65 g RHODAFAC™ surfactant. The mixture was milled with 22 g of glass beads in a paint shaker for 17 hours to form a monomer-pigment emulsion. Separately, a reaction vessel containing 20 ml water was heated to 90° C. About 0.15 g solid potassium persulfate was added to the reaction bath, followed by the dropwise addition of the monomer-pigment emulsion. The reaction bath was stirred and maintained at 90° C. for 2 hours, and then cooled to ambient temperature. The latex-encapsulated pigment product was neutralized with 50% potassium hydroxide to bring the latex solution to pH 9. The resulting product was then filtered using a 200 mesh filter.

Example 3

Preparation of Latex Particles Having Non-reactive Surfactant Adsorbed Thereon About 102.5 g of methyl methacrylate, 120 g of hexyl acrylate, 25 g of mono-methacryloyloxyethyl succinate, 2.5 g of ethylene glycol dimethacrylate, and 1 g of isooctylthioglycolate were mixed together in an addition funnel to form a monomer mixture. About 85 g of water and 20.8 g of 30% RHODAFAC™ (non-reactive surfactant) surfactant were added to the monomer mixture and sheared gently to form an emulsion. At the same time, 725 ml of water were heated to 90° C. in a reactor. An initiator solution was separately prepared by dissolving 0.87 g of potassium persulfate in 100 ml of water. The initiator solution was added dropwise to the reactor at a rate of 3 ml/min with stirring. The monomer emulsion was simultaneously added dropwise to the reactor, starting 3 minutes after the start of initiator addition and over a period of 30 minutes. The reaction mixture was maintained at 90° C. for 2 hours with stirring following addition of the additives. The reaction mixture was allowed to cool to 50° C. at which time 23 g of 17.5% potassium hydroxide solution was added to bring the pH of the reaction mixture to 8.5. The resultant latex had a particle size of 230 nm.

Example 4

Preparation of Latex Particles Having Reactive Surfactant Attached Thereto

About 102.5 g of methyl methacrylate, 120 g of hexyl acrylate, 25 g of mono-methacryloyloxyethyl succinate, 2.5 g of ethylene glycol dimethacrylate, and 1 g of isooctylthioglycolate were mixed together in an addition funnel to form a monomer mixture. About 105 g of water and 0.62 g of MAXEMUL™ 6106 (reactive surfactant) were added to the monomer mixture and sheared gently to form an emulsion. At the same time, 725 ml of water were heated to 90° C. in a reactor. An initiator solution was separately prepared by dissolving 0.87 g of potassium persulfate in 100 ml of water. The initiator solution was added dropwise to the reactor at a rate of 3 ml/min with stirring. The monomer emulsion was simultaneously added dropwise to the reactor, starting 3 minutes after the start of initiator addition and over a period of 30 minutes. The reaction mixture was maintained at 90° C. for 2 hours with stirring following addition of the additives. The reaction mixture was allowed to cool to 50° C. at which time 23 g of 17.5% potassium hydroxide solution was added to bring the pH of the reaction mixture to 8.5. The resultant latex had a particle size of 320 nm.

Example 5

Preparation of Latex-encapsulated Pigment with Non-reactive Surfactant

About 25 g of the latex from Example 3 was mixed with 5 g SUNSPERSE™ LFD 4343 along with 5 g 2-pyrrolidone. About 10 g of glass beads was added to the above mixture and ball-milled for 16 hours to obtain a latex-encapsulated pigment. The glass beads were removed by filtering through a 185 mesh filter to obtain a latex-encapsulated pigment.

Example 6

Preparation of Latex-Encapsulated Pigment with Reactive Surfactant

About 25 g of the latex from Example 4 was mixed with 5 g SUNSPERSE™ LFD 4343 along with 5 g 2-pyrrolidone. About 10 g of glass beads was added to the above mixture and ball-milled for 16 hours to obtain a latex-encapsulated pigment. The glass beads were removed by filtering through a 185 mesh filter to obtain a latex-encapsulated pigment.

Example 7

Preparation of Latex-encapsulated Pigment with Reactive Surfactant

About 25 g of the latex from Example 4 was mixed with 5 g QHD 6040 along with 5 g 2-pyrrolidone. About 10 g of glass beads was added to the above mixture and ball-milled for 16 hours to obtain a latex-encapsulated pigment. The glass beads were removed by filtering through a 185 mesh filter to obtain a latex-encapsulated pigment.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A latex-encapsulated particulate, comprising:
   (a) a particulate from 30 nm to 150 nm in size; and
   (b) a latex at least partially encapsulating the particulate, said latex having a surface dielectric constant from 2.0 to 3.0 at room temperature, and said latex-encapsulated particulate having a bulk density from 0.90 g/cm$^3$ to 2.0 g/cm$^3$.

2. A latex-encapsulated particulate as in claim 1, wherein the latex-encapsulated particulate is from 150 nm to 350 nm in size.

3. A latex-encapsulated pigment as in claim 1, wherein the latex is polymerized on the surface of the particulate.

4. A latex-encapsulated particulate as in claim 1, wherein the latex is adsorbed on the surface of the particulate.

5. A latex-encapsulated particulate as in claim 1, wherein the bulk density is from 0.90 g/cm$^3$ to 1.10 g/cm$^3$.

6. A latex-encapsulated particulate as in claim 1, wherein the surface dielectric constant is from 2.3 to 2.8.

7. A latex-encapsulated particulate as in claim 1, wherein the particulate is a color-imparting pigment.

8. A latex-encapsulated particulate as in claim 1, further comprising surfactant adsorbed on the surface of the latex.

9. A latex-encapsulated particulate as in claim 1, wherein a crosslinking agent is present in the latex at from 0.1 wt % to 5 wt %.

10. A latex-encapsulated particulate as in claim 1, wherein the latex has a glass transition temperature from 0° C. to 50° C.

11. A latex-encapsulated particulate as in claim 1, wherein the latex includes at least one ring-containing monomer.

12. A latex-encapsulated particulate, comprising:
    (a) a particulate from 30 nm to 150 nm in size;
    (b) a latex at least partially encapsulating the particulate; and
    (c) a reactive surfactant covalently attached to the surface of the latex, said latex-encapsulated particulate having a bulk density of from 0.90 g/cm$^3$ to 2.0 g/cm$^3$ and said latex having a surface dielectric constant from 2.0 to 3.0.

13. A latex-encapsulated particulate as in claim 12, wherein the latex-encapsulated particulate is from 150 nm to 350 nm in size.

14. A latex-encapsulated pigment as in claim 12, wherein the latex is polymerized on the surface of the particulate.

15. A latex-encapsulated particulate as in claim 12, wherein the latex is adsorbed on the surface of the particulate.

16. A latex-encapsulated particulate as in claim 12, wherein the bulk density is from 0.90 g/cm$^3$ to 1.10 g/cm$^3$, and the latex has a surface dielectric constant from 2.3 to 2.8.

17. A latex-encapsulated particulate as in claim 12, wherein the particulate is a color-imparting pigment.

18. A latex-encapsulated particulate as in claim 12, wherein a crosslinking agent is present in the latex at from 0.1 wt % to 5 wt %.

19. A latex-encapsulated particulate as in claim 12, wherein the latex has a glass transition temperature from 0° C. to 50° C.

20. A latex-encapsulated particulate as in claim 12, wherein the latex includes at least one ring-containing monomer.

21. An ink-jet ink, comprising:
    (a) an ink vehicle; and
    (b) a latex-encapsulated pigment dispersed in the ink vehicle including:
        i. a pigment being from 30 nm to 150 nm in size, and
        ii. a latex at least partially encapsulating the pigment, said latex having a surface dielectric constant from 2.0 to 3.0 at room temperature, and said latex-encapsulated particulate having a bulk density from 0.90 g/cm$^3$ to 2.0 g/cm$^3$.

22. An ink-jet ink as in claim 21, wherein the bulk density is from 0.90 g/cm$^3$ to 1.10 g/cm$^3$.

23. An ink-jet ink as in claim 21, wherein the surface dielectric constant is from 2.3 to 2.8.

24. An ink-jet ink as in claim 21, further comprising surfactant adsorbed on the surface of the latex.

25. An ink-jet ink as in claim 21, wherein a crosslinking agent is present in the latex at from 0.1 wt % to 5 wt %.

26. An ink-jet ink as in claim 21, wherein the latex has a glass transition temperature from 0° C. to 50° C.

27. An ink-jet ink as in claim 21, wherein the latex includes at least one ring-containing monomer.

28. An ink-jet ink as in claim 21, wherein the pigment is a self-dispersed pigment.

29. An ink-jet ink as in claim 21, wherein the ink vehicle includes a predominant amount of water, and further includes from 5 wt % to 30 wt % cosolvent, and from 0 wt % to 5 wt % vehicle surfactant.

30. An ink-jet ink as in claim 21, further comprising an effective amount of a colorant that is not encapsulated by the latex.

31. An ink-jet ink, comprising:
    (a) an ink vehicle; and
    (b) a latex-encapsulated pigment dispersed in the ink vehicle including:
        i. a pigment being from 30 nm to 150 nm in size,
        ii. a latex at least partially encapsulating the pigment, and
        iii. a reactive surfactant covalently attached to the surface of the latex;

said latex-encapsulated particulate having a bulk density of from 0.90 g/cm$^3$ to 2.0 g/cm$^3$ and said latex having a surface dielectric constant from 2.0 to 3.0.

32. An ink-jet ink as in claim 31, wherein the bulk density is from 0.90 g/cm$^3$ to 1.10 g/cm$^3$ and the surface dielectric constant of the latex is from 2.3 to 2.8.

33. An ink-jet ink as in claim 31, wherein a crosslinking agent is present in the latex at from 0.1 wt % to 5 wt %.

34. An ink-jet ink as in claim 31, wherein the latex has a glass transition temperature from 0° C. to 50° C.

35. An ink-jet ink as in claim 31, wherein the latex includes at least one ring-containing monomer.

36. An ink-jet ink as in claim 31, wherein the pigment is a self-dispersed pigment.

37. An ink-jet ink as in claim 31, wherein the ink vehicle includes a predominant amount of water, and further includes from 5 wt % to 30 wt % cosolvent, and from 0 wt % to 5 wt % vehicle surfactant.

38. An ink-jet ink as in claim 31, further comprising an effective amount of a colorant that is not encapsulated by the latex.

* * * * *